United States Patent
Yang

(10) Patent No.: US 10,771,241 B2
(45) Date of Patent: Sep. 8, 2020

(54) TIME AUTHENTICATION METHOD, APPARATUS AND DEVICE IN BLOCKCHAIN-TYPE LEDGER

(71) Applicant: Alibaba Group Holding Limited, George Town (KY)

(72) Inventor: Xinying Yang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/803,289

(22) Filed: Feb. 27, 2020

(65) Prior Publication Data

US 2020/0195423 A1    Jun. 18, 2020

Related U.S. Application Data

(63) Continuation of application No. PCT/CN2020/071687, filed on Jan. 13, 2020.

(30) Foreign Application Priority Data

May 23, 2019    (CN) .......................... 2019 1 0436532

(51) Int. Cl.
  *H04L 9/06*    (2006.01)
  *H04L 9/32*    (2006.01)
  *G06F 16/901*  (2019.01)

(52) U.S. Cl.
  CPC ........ *H04L 9/0643* (2013.01); *G06F 16/9027* (2019.01); *H04L 9/0637* (2013.01);
  (Continued)

(58) Field of Classification Search
  CPC ... H04L 9/0643; H04L 9/0637; H04L 9/3236; H04L 9/3265; H04L 9/3297; H04L 9/3247; H04L 2209/38; G06F 16/9027
  (Continued)

(56) References Cited

U.S. PATENT DOCUMENTS 10,616,324 B1 *   4/2020   Kaddoura .............. H04L 69/329
2018/0189333 A1    7/2018   Childress et al.
(Continued)

FOREIGN PATENT DOCUMENTS

CN    106407795    2/2017
CN    109064324    12/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Mohammad W Reza
(74) *Attorney, Agent, or Firm* — Fish & Richardson P.C.

(57) ABSTRACT

Computer-implemented methods, systems, and non-transitory, computer-readable media for server-based time authentication of blockchain-type ledgers are provided. One computer implemented method includes: determining at least one ledger that needs time authentication and includes one or more consecutive data blocks. For each ledger, determining ledger information corresponding to the ledger and including a plurality of items, such as: an identifier of the ledger, a block height of a starting block of the ledger, a block height of an ending block of the ledger, and a root hash of a Merkle tree formed by the one or more consecutive data blocks in the ledger. The ledger information is sent to a trusted time authentication agency for time authentication on each of the plurality of items. A time certificate, including a timestamp, the ledger information, and a digital signature of the time authentication agency is received from the time authentication agency.

24 Claims, 7 Drawing Sheets

(52) U.S. Cl.
CPC .......... *H04L 9/3236* (2013.01); *H04L 9/3247* (2013.01); *H04L 9/3265* (2013.01); *H04L 9/3297* (2013.01); *H04L 2209/38* (2013.01)

(58) Field of Classification Search
USPC .......................................................... 380/37
See application file for complete search history.

(56) References Cited

U.S. PATENT DOCUMENTS

| | | | |
|---|---|---|---|
| 2019/0019180 A1* | 1/2019 | Coburn | H04L 9/3213 |
| 2019/0229930 A1* | 7/2019 | Haque | H04L 67/12 |
| 2019/0253256 A1* | 8/2019 | Saab | H04L 9/0637 |

FOREIGN PATENT DOCUMENTS

| | | |
|---|---|---|
| CN | 109118223 | 1/2019 |
| CN | 109508984 | 3/2019 |
| CN | 109902086 | 6/2019 |
| CN | 110266494 | 9/2019 |
| EP | 3007120 | 4/2016 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Appln No. PCT/CN2020/071687, dated Apr. 15, 2020, 14 pages [with partial machine translation] .

* cited by examiner

TIME AUTHENTICATION METHOD, APPARATUS AND DEVICE IN BLOCKCHAIN-TYPE LEDGER

CROSS-REFERENCE TO RELATED APPLICATIONS

This application is a continuation of PCT Application No. PCT/CN2020/071687, filed on Jan. 13, 2020, which claims priority to Chinese Patent Application No. 201910436532.2, filed on May 23, 2019, and each application is hereby incorporated by reference in its entirety.

TECHNICAL FIELD

Implementations of the present specification relate to the field of information technologies, and in particular, to time authentication methods, apparatuses and devices in a blockchain-type ledger that stores data based on a blockchain data structure (e.g., in a form of a blockchain).

BACKGROUND

In a blockchain-type ledger, a service provider can hardly modify data directly. However, there is still a possibility that a user or an enterprise and the service provider jointly falsify the data. Therefore, a user needs to perform time authentication on a ledger of the user to prevent fraud. Time authentication needs to be performed on multiple ledgers when there are many ledgers.

Based on this, a solution to perform time authentication in batches in a blockchain-type ledger is needed.

SUMMARY

An objective of the implementations of the present application is to provide methods for performing batch time authentication on multiple ledgers in a blockchain-type ledger.

To alleviate the previous technical problem, the implementations of the present application are implemented as follows:

A time authentication method in a blockchain-type ledger is applied to a centralized database server storing data by using a blockchain-type ledger, where the method includes the following: determining a set of target ledgers that need time authentication, where the set includes at least one target ledger, and the target ledger includes at least one data block or includes multiple data blocks with consecutive block heights in the same ledger; determining, for each target ledger in the set, related information that needs to be included for performing time authentication on the target ledger, and generating a set of related information, where each piece of related information corresponds to one target ledger, and the related information includes an identifier of the target ledger, a starting block height, an ending block height, and a root hash of a Merkle tree formed by data blocks in the target ledger; sending the set of related information to a trusted time authentication agency, so that the trusted time authentication agency performs time authentication on each piece of related information in the set; and receiving a set of time certificates returned by the time authentication agency, where the time certificate includes a trusted timestamp, the related information, and a trusted time authentication agency digital signature, and time certificates and related information included in the time certificates are in a one-to-one correspondence with target ledgers.

Correspondingly, some implementations of the present specification further provide a time authentication device in a blockchain-type ledger, applied to a centralized database server storing data by using a blockchain-type ledger, where the device includes the following: a target ledger determining module, configured to determine a set of target ledgers that need time authentication, where the set includes at least one target ledger, and the target ledger includes at least one data block or includes multiple data blocks with consecutive block heights in the same ledger; an information generation module, configured to determine, for each target ledger in the set, related information that needs to be included for performing time authentication on the target ledger, and generate a set of related information, where each piece of related information corresponds to one target ledger, and the related information includes an identifier of the target ledger, a starting block height, an ending block height, and a root hash of a Merkle tree formed by data blocks in the target ledger; a sending module, configured to send the set of related information to a trusted time authentication agency, so that the trusted time authentication agency performs time authentication on each piece of related information in the set; and a time certificate receiving module, configured to receive a set of time certificates returned by the time authentication agency, where the time certificate includes a trusted timestamp, the related information, and a trusted time authentication agency digital signature, and time certificates and related information included in the time certificates are in a one-to-one correspondence with target ledgers.

According to the solutions provided in the implementations of the present specification, during time authentication, batches of target ledgers that need time authentication can be applied for, so as to reduce situations that time authentication is applied for each ledger separately. In addition, during batch time authentication, personalized time authentication can be performed based on a time granularity selected by a user. According to the solutions provided in the implementations of the present specification, target ledgers are registered in batches, so that efficiency can be improved, and time certificates can be managed easily.

It should be understood that the previous general description and the following detailed description are merely examples and explanations, and cannot limit the implementations of the present specification.

In addition, any one of the implementations of the present specification does not need to achieve all the previous effects.

BRIEF DESCRIPTION OF DRAWINGS

To describe the technical solutions in the implementations of the present specification or in the existing technology more clearly, the following briefly describes the accompanying drawings required for describing the implementations or the existing technology. Clearly, the accompanying drawings in the following description merely show some implementations of the present specification, and a person of ordinary skill in the art can still derive other drawings from these accompanying drawings.

DESCRIPTION OF IMPLEMENTATIONS

To make a person skilled in the art understand the technical solutions in the implementations of the present specification better, the following describes in detail the technical solutions in the implementations of the present specification with reference to the accompanying drawings in the implementations of the present specification. Clearly, the described implementations are merely some but not all of the implementations of the present specification. Other implementations obtained by a person of ordinary skill in the art based on the implementations of the present specification shall fall within the protection scope.

Figure 1:
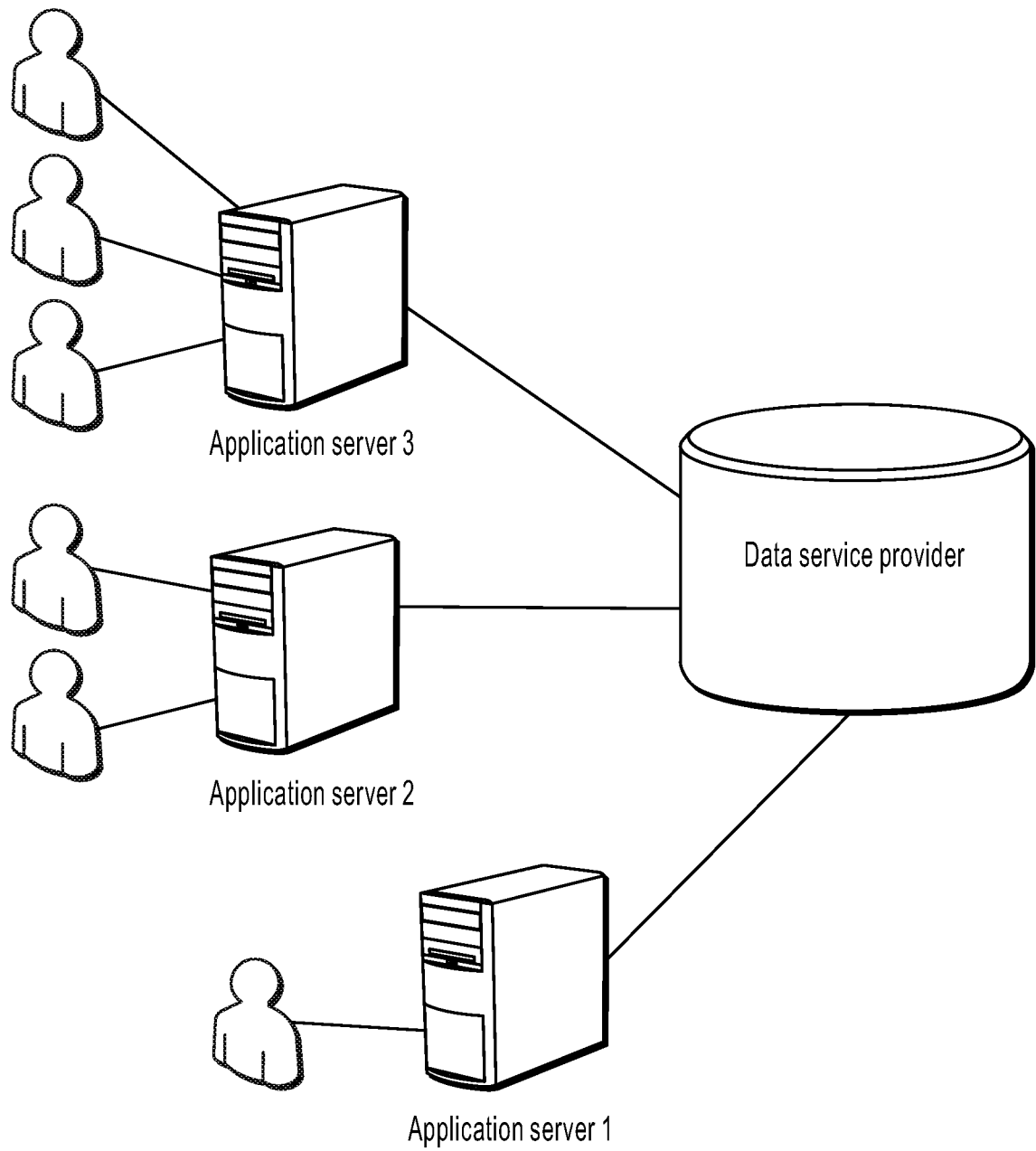
FIG. 1 is a schematic diagram illustrating a system architecture involved in an existing technology.

First, it is worthwhile to note that, in a current server architecture, a database server can directly interface with a client of an individual user, or some application servers can interface with a client individual user, and a database server can interface with the application servers. As shown in FIG. 1, FIG. 1 is a schematic diagram illustrating a system architecture involved in an existing technology.

Therefore, in some implementations of the present specification, when a user is an application server, a database service provider can be the database server shown in FIG. 1. However, when a user is a client individual user, a database service provider can be a group of servers that includes an application server and a database server. However, in whatever case, data is stored by the database service provider, and operations (including adding, deleting, modifying, and querying) of the data are also performed by the database service provider based on an instruction of a user. Both the user data and an operation result of the data are stored by the database service provider, and the user does not store data locally or on another device. In other words, the database service provider in the present specification provides data services in a centralized way.

Figure 2:
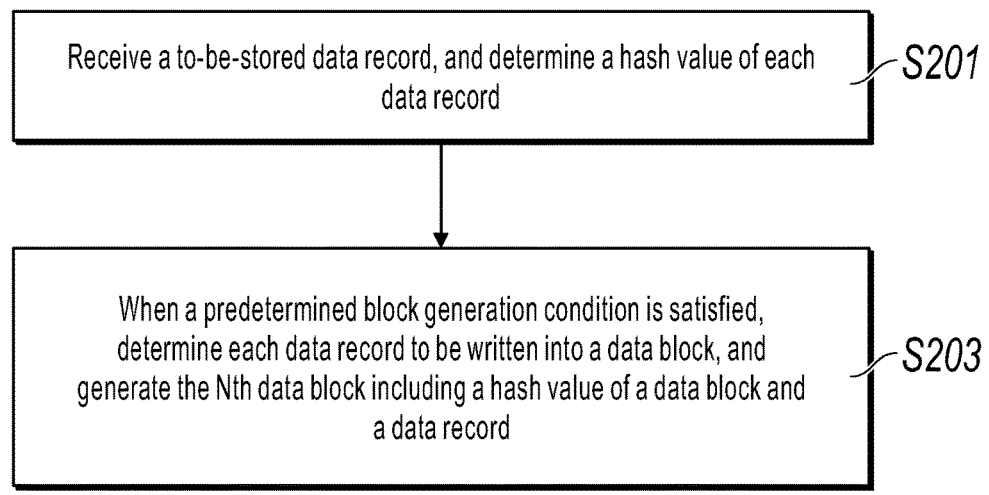
FIG. 2 is a schematic flowchart illustrating a method for generating a data block in a blockchain-type ledger, according to some implementations of the present specification.

On a centralized database server involved in the implementations of the present specification, a data block can be generated in advance in the following way. As shown in FIG. 2, FIG. 2 is a schematic flowchart illustrating a method for generating a data block in a blockchain-type ledger, according to some implementations of the present specification. The method includes the following steps.

S201. Receive a to-be-stored data record, and determine a hash value of each data record. Here, the to-be-stored data record can be any expenses record of a client individual user, or can be a service result, an intermediate state, an operation record, etc. generated when an application server executes service logic based on an instruction of a user. Specific service scenarios can include an expenses record, an audit log, a supply chain, a government supervision record, a medical record, etc.

S203. When a predetermined block generation condition is satisfied, determine each data record to be written into a data block, and generate the Nth data block including a hash value of a data block and a data record.

The predetermined block generation condition includes the following: A quantity of to-be-stored data records reaches a quantity threshold; for example, each time one thousand data records are received, a new data block is generated, and the one thousand data records are written into the block; or a time interval after a previous block generation moment reaches a time threshold; for example, a new data block is generated every five minutes, and data records received within the five minutes are written into the block.

Here, N is a sequence number of a data block. In other words, in some implementations of the present specification, data blocks are arranged in the form of a blockchain based on a sequence of block generation times, and have a strong time sequence characteristic. Block heights of data blocks increase monotonously based on a sequence of block generation times. The block height can be a sequence number. In this case, a block height of the Nth data block is N. Or, the block height can be generated in another way. For example, a block generation timestamp of a data block is converted into monotonously increasing large integer, and the large integer is used as a block height of the data block.

When N=1, a data block is an initial data block. A hash value and a block height of the initial data block are provided based on a predetermined method. For example, the initial data block includes no data record, a hash value is any given hash value, and a block height blknum is 0. For another example, a trigger condition for generating the initial data block is consistent with a trigger condition for another data block, but a hash value of the initial data block is determined by hashing all content in the initial data block.

When N>1, because content and a hash value of a previous data block are determined, a hash value of the current data block (the Nth data block) can be generated based on the hash value of the previous data block (i.e., the (N−1)th data block). For example, in a feasible method, a hash value of each data record to be written into the Nth block is determined, a Merkle tree is generated based on an arrangement sequence of hash values in the block, and a root hash value of the Merkle tree is connected with the hash value of the previous data block. Then, the hash value of the current block is generated by using a hash algorithm, or the hash value of the current block can be generated based on the root hash value of the Merkle tree and some other metadata (e.g., a version number or a data block generation timestamp). For another example, connection and hashing can be performed based on a sequence of data records in a block, to obtain a hash value of an overall data record, a hash value of a previous data block is connected with the hash value of the overall data record, and a hash operation is performed on a string obtained through connection to generate a hash value of the data block.

In the previously described data block generation method, each data block is determined by using a hash value, and a hash value of a data block is determined by using content of data records in the data block, a sequence of the data records, and a hash value of a previous data block. A user can initiate verification based on a hash value of a data block or a hash value of a data record at any time. Modification to any content in a data block (including modification to content or a sequence of data records in the data block) causes inconsistency between a hash value of the data block calculated during verification and a hash value existing when the data block is generated, causing a verification failure. Therefore, immutability of the ledger can be realized under a centralized environment.

Figure 3:
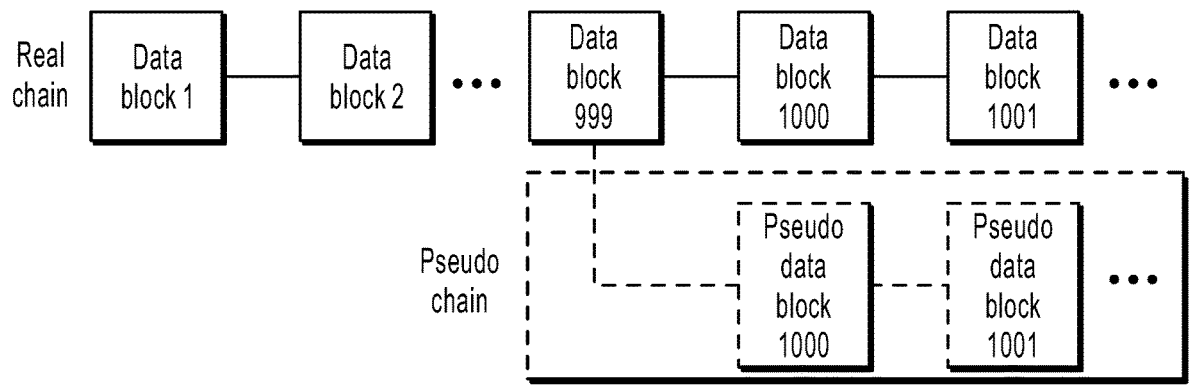
FIG. 3 is a schematic diagram illustrating a pseudo chain, according to some implementations of the present specification.

In the previously described method, it is still possible that a user and a service provider jointly forge some data blocks, and regenerate a related pseudo chain, to obtain a new ledger that is partially the same as the current ledger, so as to avoid related audit and verification. As shown in FIG. 3, FIG. 3 is a schematic diagram illustrating a pseudo chain, according to some implementations of the present specification. In the process of generating a pseudo chain, a block generation method of a data block is the same as the previously described block generation method.

In this schematic diagram, after a ledger has recorded many data blocks, a service provider considers that a data record in the 1000th data block has problems. Therefore, to prevent the exposure of the problem, the service provider cooperates with a database service provider to replace data blocks from the 1000th data block, to regenerate a new 1000th data block and obtain a pseudo chain that is partially the same as the current ledger after the 999th data block, so as to avoid verification and audit. A pseudo chain and a real chain cannot be distinguished by an external third party.

Figure 4:
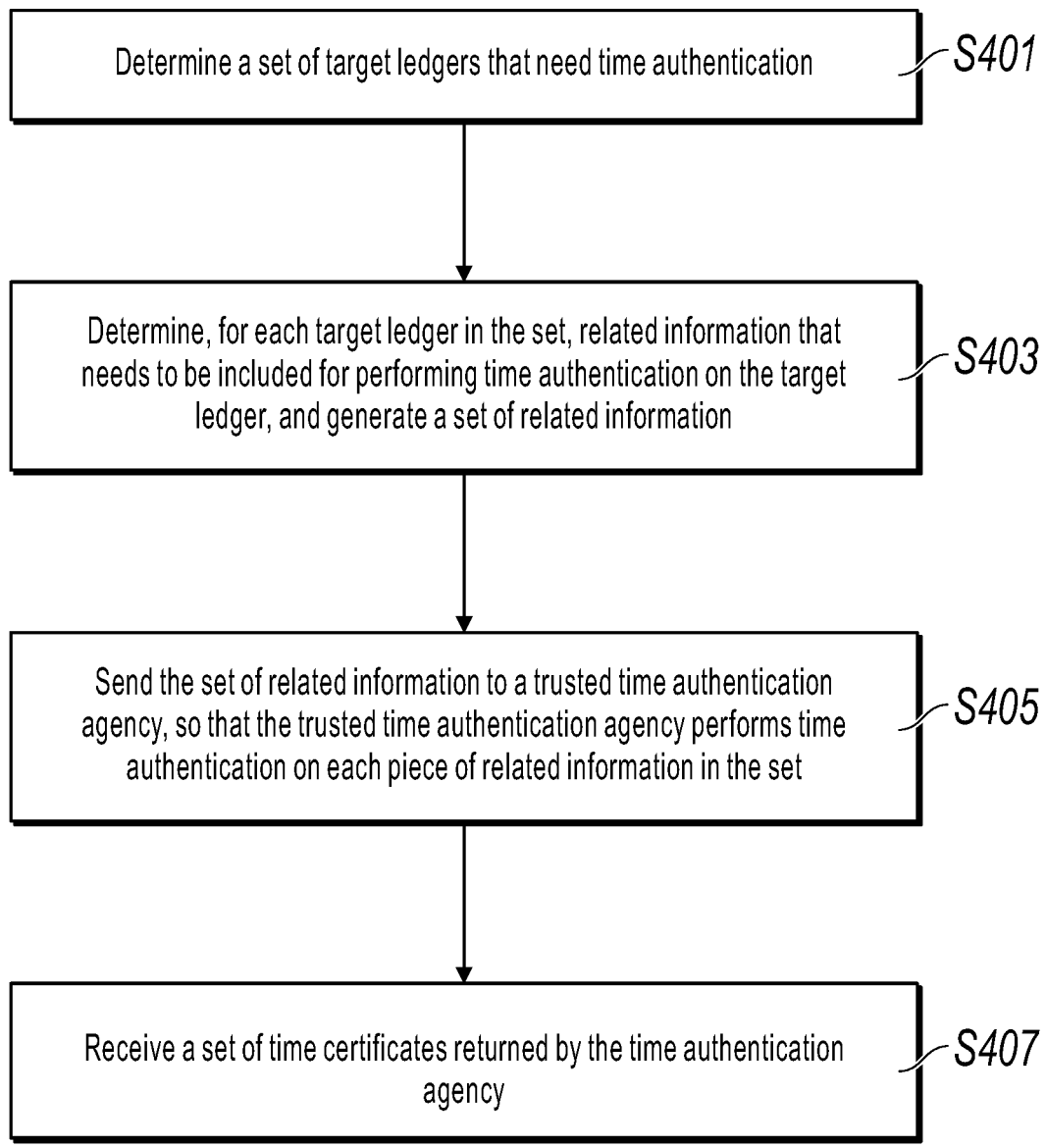
FIG. 4 is a schematic flowchart illustrating a time authentication method in a blockchain-type ledger, according to some implementations of the present specification.

Based on this, some implementations of the present specification further provide a time authentication method for a ledger. As shown in FIG. 4, FIG. 4 is a schematic flowchart illustrating a time authentication method in a blockchain-type ledger, according to some implementations of the present specification, and the method includes the following steps.

S401. Determine a set of target ledgers that need time authentication, where the set includes at least one target ledger, and the target ledger includes at least one data block or includes multiple data blocks with consecutive block heights in the same ledger.

As described above, in the blockchain-type ledger, each of data blocks except an initial data block includes at least one data record, each data block includes a hash value of the data block that is determined by using a hash value of a previous data block and a data record included in the data block, and block heights of data blocks increase monotonically based on a sequence of block generation times. In other words, the data blocks exist in the form of a chain.

Time authentication can be performed on an element (i.e., any target ledger) included in the set of target ledgers based on an application of a user, or time authentication can be performed on all ledgers on a server by default. Specifically, which target ledger should be included in the set of target ledgers can be determined by using a ledger identifier. The set of target ledgers usually includes multiple target ledgers that need time authentication.

In some implementations of the present specification, the target ledger can be a complete ledger. However, in more situations, the target ledger is some ledgers with consecutive block heights in a certain ledger determined by using a ledger identifier, or is a data block in a ledger determined by using a ledger identifier.

Specific content of the target ledger can be specified based on a user operation. For example, a user initiates a time authentication instruction, where the instruction includes an identifier of a ledger that needs time authentication, a starting block height, and quantity of blocks, and some ledgers determined by using the ledger identifier, the starting block height, and the block quantity are used as the target ledger.

Alternatively, the target ledger can be automatically determined by the server based on predetermined service logic instead of being specified by the user. For example, for each data block in each ledger on the server, time authentication can be applied for in terms of a finest granularity. In this method, for a target ledger, a root hash of a Merkle tree of some ledgers is a block hash value of the data block. In this method, authenticity protection can be performed on each ledger (i.e., each data block) to the maximum extent. Because a data block has a relatively high block generation frequency, costs are relatively high in this method for both a time authentication center and a service provider.

In an optional method, a predetermined time authentication condition is set for a ledger. When the predetermined time authentication condition is satisfied, some ledgers are determined from the ledger as the target ledgers. For a ledger, when each newly generated data block is considered as a data block needing time authentication, the predetermined time authentication condition can be as follows: A quantity of data blocks needing time authentication reaches a quantity threshold; or a time interval after previous time authentication reaches a time threshold. In this case, some newly generated ledgers formed by data blocks on which no time authentication has been performed are used as the target ledgers.

S403. Determine, for each target ledger in the set, related information that needs to be included for performing time authentication on the target ledger, and generate a set of related information, where each piece of related information corresponds to one target ledger, and the related information includes an identifier of the target ledger, a starting block height, an ending block height, and a root hash of a Merkle tree formed by data blocks in the target ledger.

First, for any target ledger, a root hash of a Merkle tree can be determined based on a sequence of data blocks in the target ledger and a hash value of each data block. A specific root hash calculation method is conventional, and details are omitted here for simplicity. When a target ledger includes only one data block, a hash value of the data block is a root hash of a Merkle tree in the target ledger.

The identifier of the target ledger, the starting block height, and the ending block height are determined in S401. In this case, for each target ledger, related information of the target ledger is generated correspondingly.

S405. Send the set of related information to a trusted time authentication agency, so that the trusted time authentication agency performs time authentication on each piece of related information in the set.

For example, the trusted time authentication agency can be a national time authentication center or a corresponding time authentication agency authorized by the national time authentication center. The trusted time authentication agency receives the set of related information, provides a trusted timestamp for any related information, and performs digital signature authentication on the trusted timestamp to generate a time certificate including the trusted timestamp and a digital signature. The time certificate can further include the related information of the target ledger.

Figure 5:
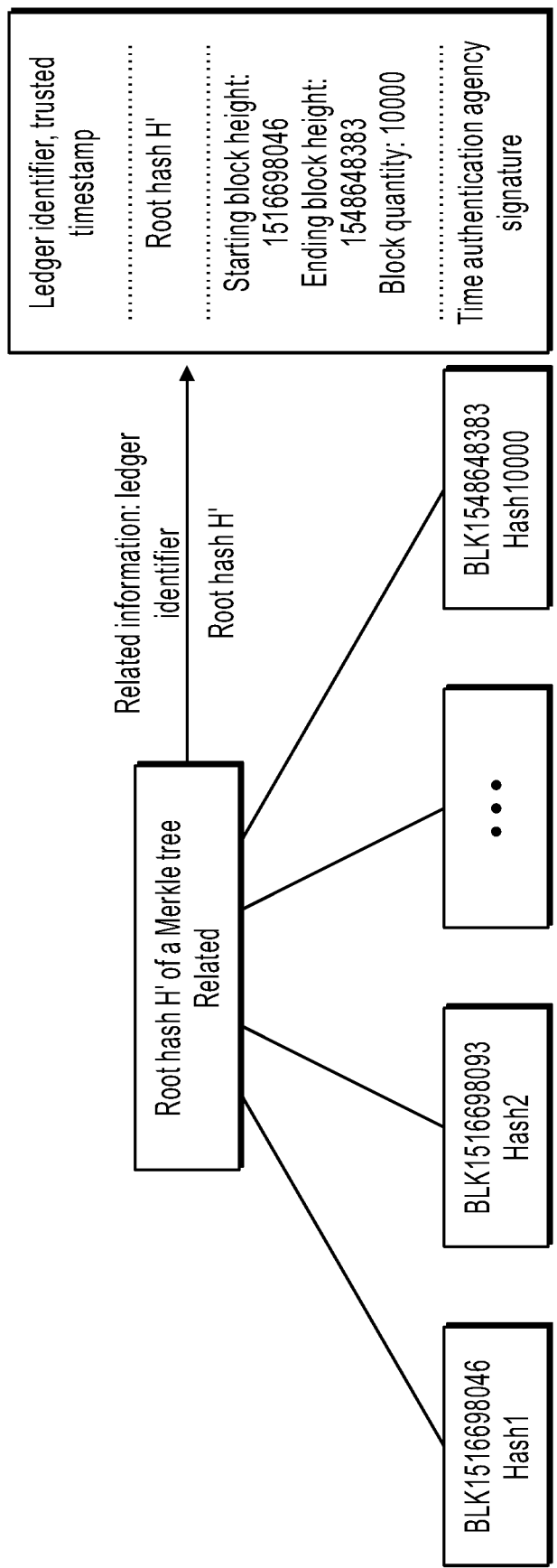
FIG. 5 is a schematic structural diagram illustrating a time certificate, according to some implementations of the present specification.

The ledger identifier in the related information may be or may be not written into encrypted information of the time certificate. The returned time certificate should include a corresponding ledger identifier to distinguish multiple time certificates. A digital signature method is conventional private key encryption and public key decryption. As shown in FIG. 5, FIG. 5 is a schematic structural diagram illustrating a time certificate, according to some implementations of the present specification.

S407. Receive a set of time certificates returned by the time authentication agency, where the time certificate includes a trusted timestamp, the related information, and a trusted time authentication agency digital signature, and time certificates and related information included in the time certificates are in a one-to-one correspondence with target ledgers.

Each time the server receives a batch of time certificates, the server can determine a corresponding ledger by using a ledger identifier in the time certificates.

For a certain ledger, the database server can receive a series of trusted time certificates about the ledger that includes a signature of a time notarization agency, and each time certificate includes a trusted timestamp and corresponds to a part of the ledger.

Figure 6:
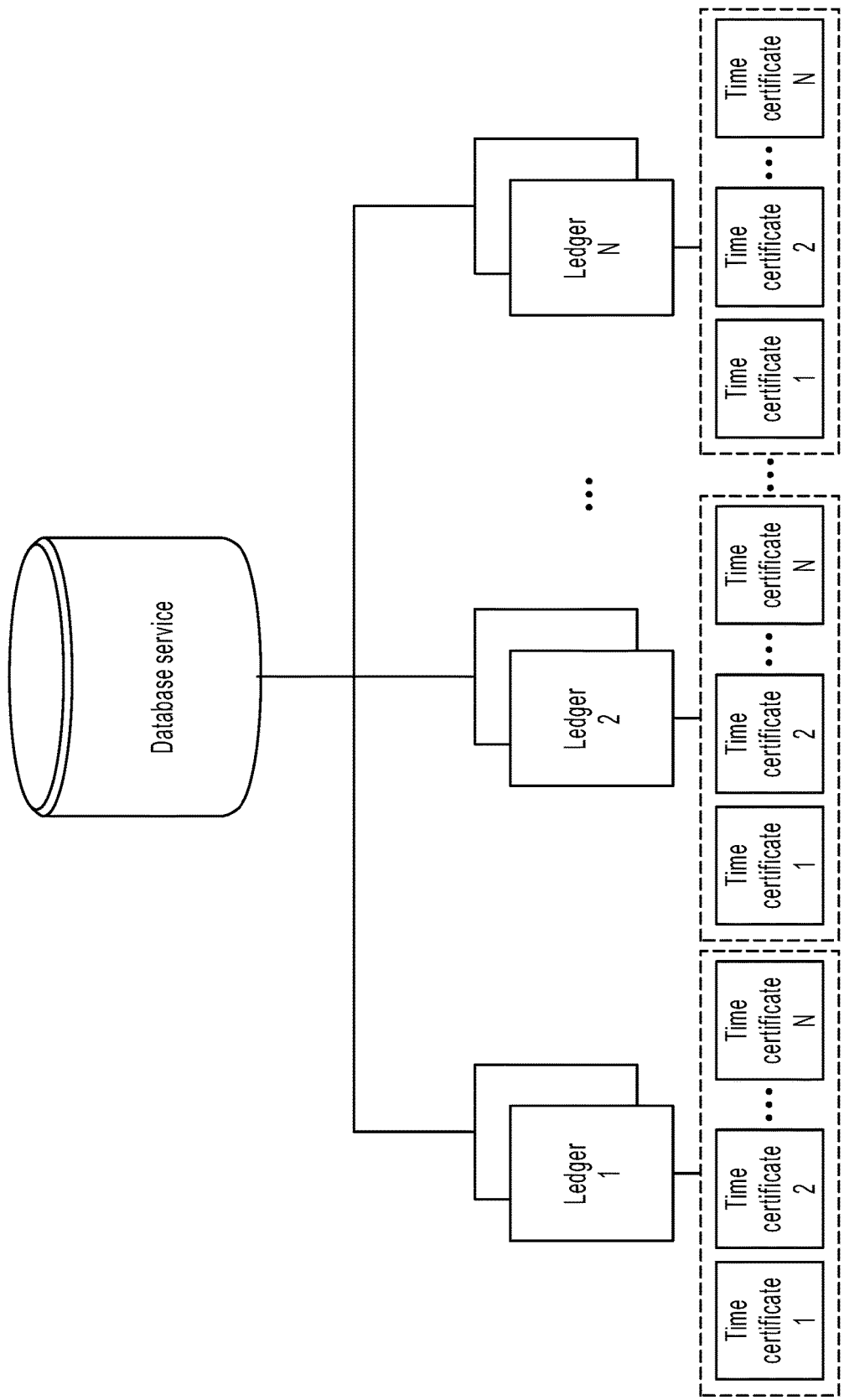
FIG. 6 is a schematic diagram illustrating time certificates of multiple ledgers on a database server.

A time certificate can prove that some ledgers corresponding to the time certificate are generated before the trusted timestamp. Some ledgers can be clearly determined from related information in the time certificate. A database service provider can perform corresponding management and verification on a series of time certificates. For example, the database service provider can sequentially number the time certificates, and establish a database or an index about a time certificate. The database or the index includes a starting data block height, an ending data block height, and a table of correspondence between a root hash value of some ledgers corresponding to the time certificate and a time certificate number. As shown in FIG. 6, FIG. 6 is a schematic diagram illustrating time certificates of multiple ledgers on a database server.

According to the solution provided in some implementations of the present specification, during time authentication, batches of target ledgers that need time authentication can be applied for, so as to reduce situations that time authentication is applied for each ledger separately. Therefore, efficiency is improved, and management is easier.

In some implementations, before batch authentication is performed, to reduce target ledgers on which authentication is to be performed at a time, a corresponding time authentication condition can be predetermined, so as to divide a set of related information.

Specifically, the method can include the following: sending a set including a specified quantity of related information to the trusted time authentication agency; for example, it is specified that a set of related information includes no more than 100 pieces of related information in one authentication process; or sending a set of related information that does not occupy more than specified space to the trusted time authentication agency; for example, a set of related information does not occupy more than 1 M space in one authentication process.

In some implementations, the server can provide a time authentication registration service to a user, and authenticated time can be registered on a ledger that succeeds in time authentication registration. In the registration service, the user can register an identifier of a ledger that needs to be registered and a time granularity of time authentication. For example, the user can choose to perform time authentication every 10 days (i.e., to perform time authentication by using data blocks generated every 10 days as a target ledger), or to perform time authentication every 30 days. In practice, because time authentication is performed by using the trusted time authentication agency, additional expenses can be needed for the user. Therefore, the user can customize a granularity of time authenticated events based on actual needs, to improve user experience.

Time authentication information registered by the user can be stored in the form of a registration information table, where the registration information table includes an identifier of a ledger that needs to be registered and a time granularity of performing time authentication on the ledger, so that the database server can automatically obtain the ledger that needs to be registered from the registration information table based on the ledger identifier.

On the basis of providing time authentication through registration, the database server first places ledgers with the same time granularity together for time authentication based on time granularities selected by the user. For example, in a time authentication service, one batch time authentication process is performed separately at the following time granularities: every one day, every 10 days, and every 30 days. In this case, the database server can generate three corresponding sets of ledgers with different time granularities, and sets of related information are sent separately.

Further, if a ledger is registered in a window between two time authentications, alignment with a time of the first registration needs to be performed based on a time granularity selected for the ledger. For example, batch time authentication with a time granularity of 10 days has been performed five days ago. If time authentication with a time granularity of 10 days is registered for a ledger, for the ledger, a time of the first time authentication is aligned with batch time authentication with the next time granularity of 10 days after five days.

Figure 7:
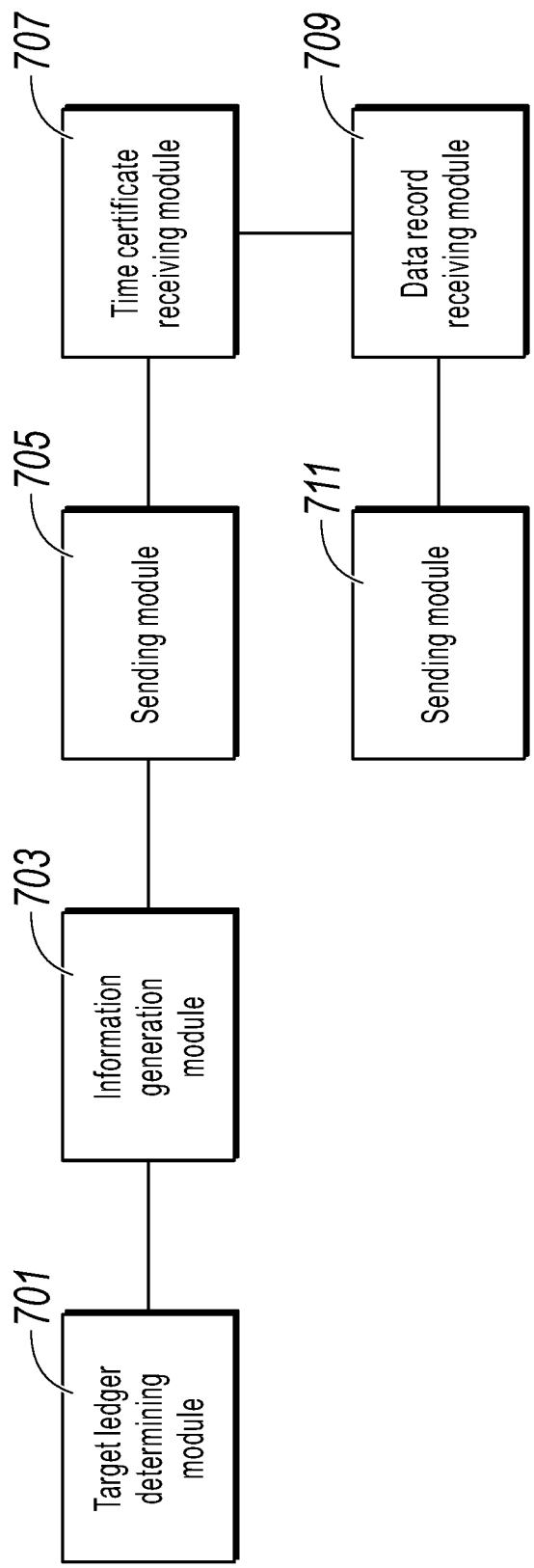
FIG. 7 is a schematic structural diagram illustrating time authentication in a blockchain-type ledger, according to some implementations of the present specification.

Correspondingly, some implementations of the present specification further provide a time authentication device in a blockchain-type ledger, applied to a centralized database server storing data by using a blockchain-type ledger. As shown in FIG. 7, FIG. 7 is a schematic structural diagram illustrating time authentication in a blockchain-type ledger according to some implementations of the present specification. The device includes the following: a target ledger determining module 701, configured to determine a set of target ledgers that need time authentication, where the set includes at least one target ledger, and the target ledger includes at least one data block or includes multiple data blocks with consecutive block heights in the same ledger; an information generation module 703, configured to determine, for each target ledger in the set, related information that needs to be included for performing time authentication on the target ledger, and generate a set of related information, where each piece of related information corresponds to one target ledger, and the related information includes an identifier of the target ledger, a starting block height, an ending block height, and a root hash of a Merkle tree formed by data blocks in the target ledger; a sending module 705, configured to send the set of related information to a trusted time authentication agency, so that the trusted time authentication agency performs time authentication on each piece of related information in the set; and a time certificate receiving module 707, configured to receive a set of time certificates returned by the time authentication agency, where the time certificate includes a trusted timestamp, the related information, and a trusted time authentication agency digital signature, and time certificates and related information included in the time certificates are in a one-to-one correspondence with target ledgers.

Further, the device includes the following: a data record receiving module 709, configured to receive a to-be-stored data record, and determine a hash value of each data record; and a data block generation module 711, configured to: when a predetermined block generation condition is satisfied, determine each data record to be written into a data block, and generate the Nth data block including a hash value of a data block and a data record, specifically including the following: when N=1, a hash value and a block height of an initial data block are provided based on a predetermined method; or when N >1, a hash value of the Nth data block is determined based on each data record to be written into the data block and a hash value of the (N−1)th data block, and the Nth data block including the hash value of the Nth data block, each data record, and a block generation time of the data block is generated, where block heights of data blocks increase monotonically based on a sequence of block generation times.

Further, in the device, the predetermined block generation condition includes the following: a quantity of to-be-stored data records reaches a quantity threshold; or a time interval after a previous block generation moment reaches a time threshold.

Further, the sending module 705 sends a set including a specified quantity of pieces of related information to the trusted time authentication agency, or sends a set of related information that does not occupy more than specified space to the trusted time authentication agency.

Further, the target ledger determining module 701 determines the target ledger that needs time authentication from a pre-established registration information table based on a ledger identifier, where the registration information table is used to store an identifier of a registered ledger that needs time authentication.

Further, the sending module 705 sends a set of related information corresponding to target ledgers with the same time granularity to the trusted time authentication agency based on time granularities of registering target ledgers in the registration information table.

Some implementations of the present specification further provide a computer device. The computer device includes at least a memory, a processor, and a computer program that is stored in the memory and can run on the processor, and the processor implements the time authentication method in a blockchain-type ledger shown in FIG. 4 when executing the program.

Figure 8:
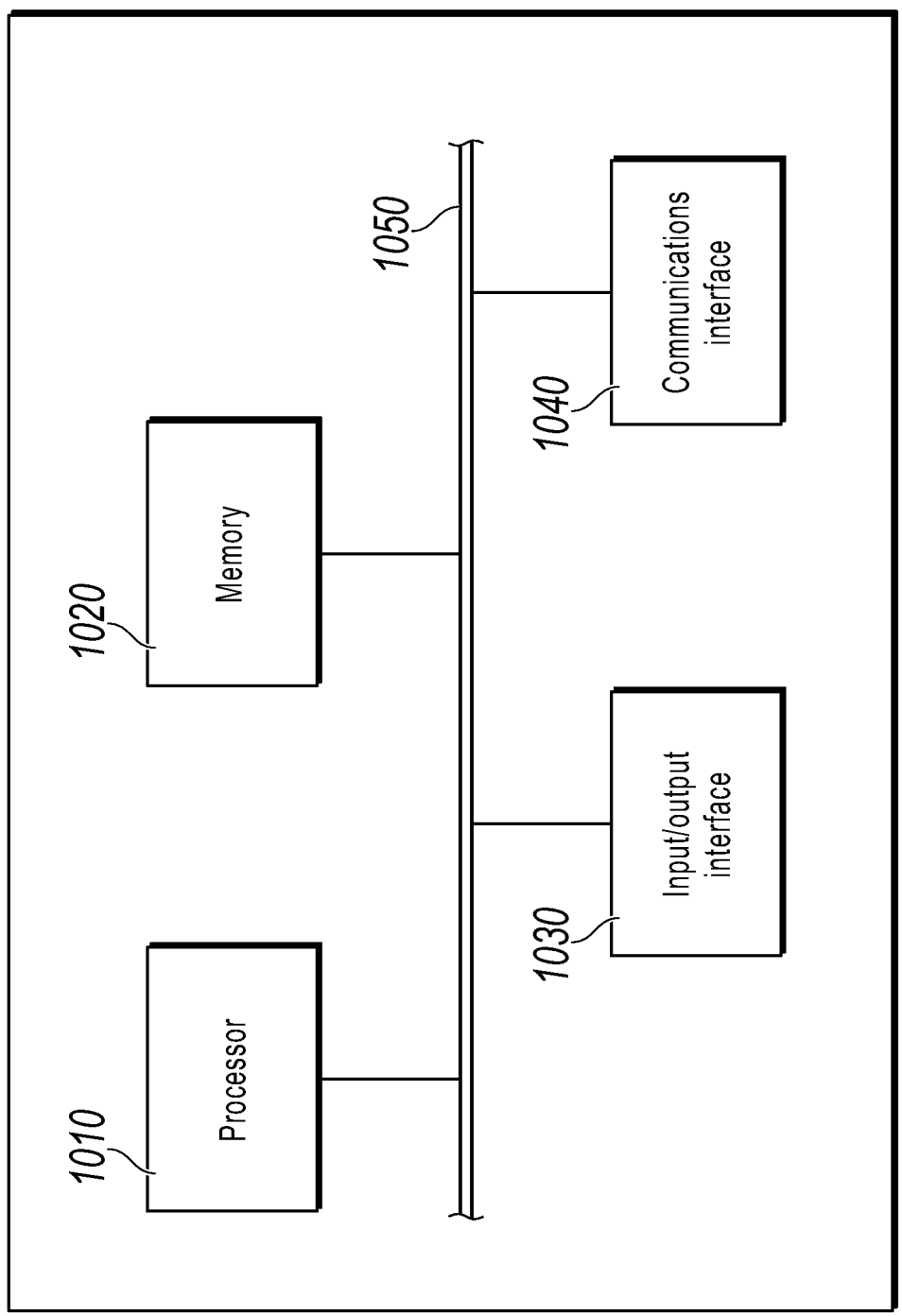
FIG. 8 is a schematic structural diagram of a device used to configure the method in the implementations of the present specification.

FIG. 8 is a more detailed schematic diagram illustrating a hardware structure of a computing device, according to some implementations of the present specification. The device can include a processor 1010, a memory 1020, an input/output interface 1030, a communications interface 1040, and a bus 1050. The processor 1010, the memory 1020, the input/output interface 1030, and the communications interface 1040 are communicatively connected to each other inside the device by using the bus 1050.

The processor 1010 can be implemented by using a general central processing unit (CPU), a microprocessor, an application-specific integrated circuit (ASIC), one or more integrated circuits, etc., and is configured to execute a related program, so as to implement the technical solutions provided in the implementations of the present specification.

The memory 1020 can be implemented by using a read-only memory (ROM), a random access memory (RAM), a static storage device, a dynamic storage device, etc. The memory 1020 can store an operating system and another application program. When the technical solutions provided in the implementations of the present specification are implemented by using software or firmware, related program code is stored in the memory 1020, and is invoked and executed by the processor 1010.

The input/output interface 1030 is configured to be connected to an input/output module, to input or output information. The input/output module (not shown in the figure) can be used as a component and configured in the device, or can be externally connected to the device, to provide a corresponding function. The input device can include a keyboard, a mouse cursor, a touchscreen, a microphone, various sensors, etc. The output device can include a monitor, a speaker, an oscillator, an indicator, etc.

The communications interface 1040 is configured to be connected to a communications module (not shown in the figure), to implement communication interaction between the device and another device. The communications module can perform wired communication (e.g., through a USB or a network cable), or can perform wireless communication (e.g., through a mobile network, Wi-Fi, or Bluetooth).

The bus 1050 includes a channel, used to transmit information between components (e.g., the processor 1010, the memory 1020, the input/output interface 1030, and the communications interface 1040) of the device.

It is worthwhile to note that although only the processor 1010, the memory 1020, the input/output interface 1030, the communications interface 1040, and the bus 1050 of the device are shown, during implementation, the device can further include other components required for implementing normal running. In addition, a person skilled in the art can understand that the device can include only components necessary for implementing the solutions in the implementations of the present specification, but does not necessarily include each component shown in the figure.

Some implementations of the present specification further provide a computer-readable storage medium. The computer-readable storage medium stores a computer program, and the time authentication method in a blockchain-type ledger shown in FIG. 4 is implemented when the program is executed by a processor.

The computer-readable medium includes persistent, non-persistent, movable, and unmovable media that can store information by using any method or technology. The information can be a computer readable instruction, a data structure, a program module, or other data. Examples of the computer storage medium include but are not limited to a phase change RAM (PRAM), a static RAM (SRAM), a dynamic RAM (DRAM), a RAM of another type, a ROM, an electrically erasable programmable read only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present specification, the computer readable medium does not include computer readable transitory media such as a modulated data signal and a carrier.

It can be seen from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be specifically implemented by using a computer chip or an entity, or can be implemented by using a product having a certain function. A typical implementation device is a computer, and the computer can be specifically a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations of the present specification are described in a progressive way. For same or similar parts of the implementations, references can be made to the implementations. Each implementation focuses on a difference from other implementations. Particularly, apparatus implementations are similar to method implementations, and therefore are described briefly. For a related part, references can be made to some descriptions in the method implementation. The previously described method implementations are merely examples. The modules described as separate parts can or cannot be physically separate. During implementation of the solutions in the implementations of the present specification, functions of the modules can be implemented in one or more pieces of software and/or hardware. Some or all of the modules can be selected based on an actual need to implement the solutions of the implementations. A person of ordinary skill in the art can understand and implement the implementations of the present specification without creative efforts.

The previous descriptions are merely specific implementations of the implementations of the present specification. It is worthwhile to note that a person of ordinary skill in the art can further make several improvements or polishing without departing from the principle of the implementations of the present specification, and the improvements or polishing shall fall within the protection scope of the implementations of the present specification.

What is claimed is:

1. A computer-implemented method for server-based time authentication of blockchain-type ledgers, comprising:
    determining at least one ledger that needs time authentication, wherein the at least one ledger includes one or more consecutive data blocks; and
    for each of the at least one ledger:
        determining, ledger information corresponding to the ledger, wherein the ledger information includes a plurality of items including an identifier of the ledger, a block height of a starting block of the ledger, a block height of an ending block of the ledger, and a root hash of a Merkle tree formed by the one or more consecutive data blocks in the ledger;
        sending the ledger information to a trusted time authentication agency for time authentication on each of the plurality of items; and
        receiving a time certificate from the trusted time authentication agency, wherein the time certificate includes a timestamp, the ledger information, and a digital signature of the trusted time authentication agency.

2. The computer-implemented method of claim 1, wherein the one or more consecutive data blocks in the ledger are generated by performing operations comprising:
    receiving data records to be stored;
    determining that a predetermined condition of generating a data block is satisfied; and
    generating the data block that includes at least a portion of the data records.

3. The computer-implemented method of claim 2, wherein the data block is a starting data block of the ledger that further includes one or more predetermined hash values and has a predetermined block-height.

4. The computer-implemented method of claim 2, wherein the data block is not a starting data block of the ledger, the data block further includes a hash value generated based on the at least a portion of the data records and a hash value of an immediately preceding data block, and a time the data block is generated, and wherein a block height of the data block is greater than a block height of the immediately preceding data block.

5. The computer-implemented method of claim 2, wherein the predetermined condition of generating a data block is one of a volume of the data records reaches a predetermined threshold and a last data block has been generated for a predetermined time.

6. The computer-implemented method of claim 1, wherein the plurality of items included in the ledger information has a predetermined quantity limit or size limit.

7. The computer-implemented method of claim 1, wherein the at least one ledger is determined based on a registration list, and the registration list includes ledger identifications corresponding to ledgers that are registered to be time authenticated.

8. The computer-implemented method of claim 7, wherein the registration list further includes times when corresponding ledgers are registered to be time authenticated, and the at least one ledger is registered within a predetermined time interval.

9. A computer-implemented system, comprising:
    one or more computers; and
    one or more computer memory devices interoperably coupled with the one or more computers and having tangible, non-transitory, machine-readable media storing one or more instructions that, when executed by the one or more computers, perform operations for server-based time authentication of blockchain-type ledgers, comprising:
        determining at least one ledger that needs time authentication, wherein the at least one ledger includes one or more consecutive data blocks; and
        for each of the at least one ledger:
            determining, ledger information corresponding to the ledger, wherein the ledger information includes a plurality of items including an identifier of the ledger, a block height of a starting block of the ledger, a block height of an ending block of the ledger, and a root hash of a Merkle tree formed by the one or more consecutive data blocks in the ledger;
            sending the ledger information to a trusted time authentication agency for time authentication on each of the plurality of items; and
            receiving a time certificate from the trusted time authentication agency, wherein the time certificate includes a timestamp, the ledger information, and a digital signature of the trusted time authentication agency.

10. The computer-implemented system of claim 9, wherein the one or more consecutive data blocks in the ledger are generated by performing operations comprising:

receiving data records to be stored;
determining that a predetermined condition of generating a data block is satisfied; and
generating the data block that includes at least a portion of the data records.

11. The computer-implemented system of claim 10, wherein the data block is a starting data block of the ledger that further includes one or more predetermined hash values and has a predetermined block-height.

12. The computer-implemented system of claim 10, wherein the data block is not a starting data block of the ledger, the data block further includes a hash value generated based on the at least a portion of the data records and a hash value of an immediately preceding data block, and a time the data block is generated, and wherein a block height of the data block is greater than a block height of the immediately preceding data block.

13. The computer-implemented system of claim 10, wherein the predetermined condition of generating a data block is one of a volume of the data records reaches a predetermined threshold and a last data block has been generated for a predetermined time.

14. The computer-implemented system of claim 9, wherein the plurality of items included in the ledger information has a predetermined quantity limit or size limit.

15. The computer-implemented system of claim 9, wherein the at least one ledger is determined based on a registration list, and the registration list includes ledger identifications corresponding to ledgers that are registered to be time authenticated.

16. The computer-implemented system of claim 15, wherein the registration list further includes times when corresponding ledgers are registered to be time authenticated, and the at least one ledger is registered within a predetermined time interval.

17. A non-transitory, computer-readable medium storing one or more instructions executable by a computer system to perform operations for server-based time authentication of blockchain-type ledgers, comprising:
determining at least one ledger that needs time authentication, wherein the at least one ledger includes one or more consecutive data blocks; and
for each of the at least one ledger:
determining, ledger information corresponding to the ledger, wherein the ledger information includes a plurality of items including an identifier of the ledger, a block height of a starting block of the ledger, a block height of an ending block of the ledger, and a root hash of a Merkle tree formed by the one or more consecutive data blocks in the ledger;
sending the ledger information to a trusted time authentication agency for time authentication on each of the plurality of items; and
receiving a time certificate from the trusted time authentication agency, wherein the time certificate includes a timestamp, the ledger information, and a digital signature of the trusted time authentication agency.

18. The non-transitory, computer-readable medium of claim 17, wherein the one or more consecutive data blocks in the ledger are generated by performing operations comprising:
receiving data records to be stored;
determining that a predetermined condition of generating a data block is satisfied; and
generating the data block that includes at least a portion of the data records.

19. The non-transitory, computer-readable medium of claim 18, wherein the data block is a starting data block of the ledger that further includes one or more predetermined hash values and has a predetermined block-height.

20. The non-transitory, computer-readable medium of claim 18, wherein the data block is not a starting data block of the ledger, the data block further includes a hash value generated based on the at least a portion of the data records and a hash value of an immediately preceding data block, and a time the data block is generated, and wherein a block height of the data block is greater than a block height of the immediately preceding data block.

21. The non-transitory, computer-readable medium of claim 18, wherein the predetermined condition of generating a data block is one of a volume of the data records reaches a predetermined threshold and a last data block has been generated for a predetermined time.

22. The non-transitory, computer-readable medium of claim 17, wherein the plurality of items included in the ledger information has a predetermined quantity limit or size limit.

23. The non-transitory, computer-readable medium of claim 17, wherein the at least one ledger is determined based on a registration list, and the registration list includes ledger identifications corresponding to ledgers that are registered to be time authenticated.

24. The non-transitory, computer-readable medium of claim 23, wherein the registration list further includes times when corresponding ledgers are registered to be time authenticated, and the at least one ledger is registered within a predetermined time interval.

* * * * *